United States Patent
Park et al.

(10) Patent No.: US 8,938,319 B2
(45) Date of Patent: Jan. 20, 2015

(54) ROBOT SLIP DETECTION APPARATUS AND METHOD

(75) Inventors: Jun-ho Park, Hwaseong-si (KR); Woo-yeon Jeong, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1322 days.

(21) Appl. No.: 12/588,957

(22) Filed: Nov. 3, 2009

(65) Prior Publication Data
US 2010/0174409 A1    Jul. 8, 2010

(30) Foreign Application Priority Data
Jan. 7, 2009    (KR) .................. 10-2009-0001307

(51) Int. Cl.
G05B 15/00    (2006.01)
G05D 1/02    (2006.01)
G06F 19/00    (2011.01)

(52) U.S. Cl.
CPC ............ G05D 1/0274 (2013.01); G05D 1/0246 (2013.01); G05D 2201/0203 (2013.01)
USPC ........... 700/259; 700/248; 700/258; 700/250; 700/252

(58) Field of Classification Search
USPC ............... 700/245, 258; 318/568.12, 568.21; 324/347, 713, 72, 72.5, 724; 180/8.1, 180/8.5, 8.7, 9.32; 901/1, 28, 29, 33, 40, 46
See application file for complete search history.

(56) References Cited

U.S. PATENT DOCUMENTS

| | | | |
|---|---|---|---|
| 4,933,864 A | 6/1990 | Evans, Jr. et al. | |
| 8,055,382 B2 * | 11/2011 | Myeong et al. | 700/253 |
| 8,135,498 B2 * | 3/2012 | Hyung et al. | 700/253 |
| 8,165,717 B2 * | 4/2012 | Kim et al. | 700/259 |
| 8,306,684 B2 * | 11/2012 | Nakano | 701/23 |
| 8,630,735 B2 | 1/2014 | Myeong et al. | |
| 2002/0153184 A1 * | 10/2002 | Song et al. | 180/167 |
| 2004/0167670 A1 * | 8/2004 | Goncalves et al. | 700/259 |
| 2005/0182518 A1 * | 8/2005 | Karlsson | 700/253 |
| 2007/0118248 A1 * | 5/2007 | Lee et al. | 700/245 |
| 2007/0290828 A1 * | 12/2007 | Choi et al. | 340/463 |
| 2008/0065267 A1 * | 3/2008 | Hong et al. | 700/245 |
| 2008/0119961 A1 * | 5/2008 | Myeong et al. | 700/262 |
| 2008/0154429 A1 * | 6/2008 | Lee et al. | 700/258 |
| 2009/0149994 A1 * | 6/2009 | Kim et al. | 700/258 |

FOREIGN PATENT DOCUMENTS

| | | |
|---|---|---|
| JP | 06-067726 | 3/1994 |
| JP | 2007-323119 | 12/2007 |
| KR | 10-2005-0011053 | 1/2005 |

(Continued)

OTHER PUBLICATIONS

Term "Slip" defintion—Merriam-Webser Dictionary.*

(Continued)

*Primary Examiner* — Ian Jen
(74) *Attorney, Agent, or Firm* — Staas & Halsey LLP

(57) ABSTRACT

A technique of detecting a slip of a robot using a particle filter and feature information of a ceiling image is disclosed. A first position of the robot is computed using a plurality of particles, a second position of the robot is computed using the feature information of the ceiling image, and whether a slip has occurred is determined based on a distance between the first position and the second position.

20 Claims, 3 Drawing Sheets

(56) References Cited

FOREIGN PATENT DOCUMENTS

| | | |
|---|---|---|
| KR | 10-2006-0074044 | 7/2006 |
| KR | 10-0809352 | 3/2008 |
| KR | 10-0866380 | 11/2008 |

OTHER PUBLICATIONS

Korean Patent Office Action dated Nov. 27, 2014 in Korean Patent Application No. 10-2009-0001307.

* cited by examiner

◆ — 301
● — 302
◇ — 303

◆ — 301
● — 302
◇ — 303

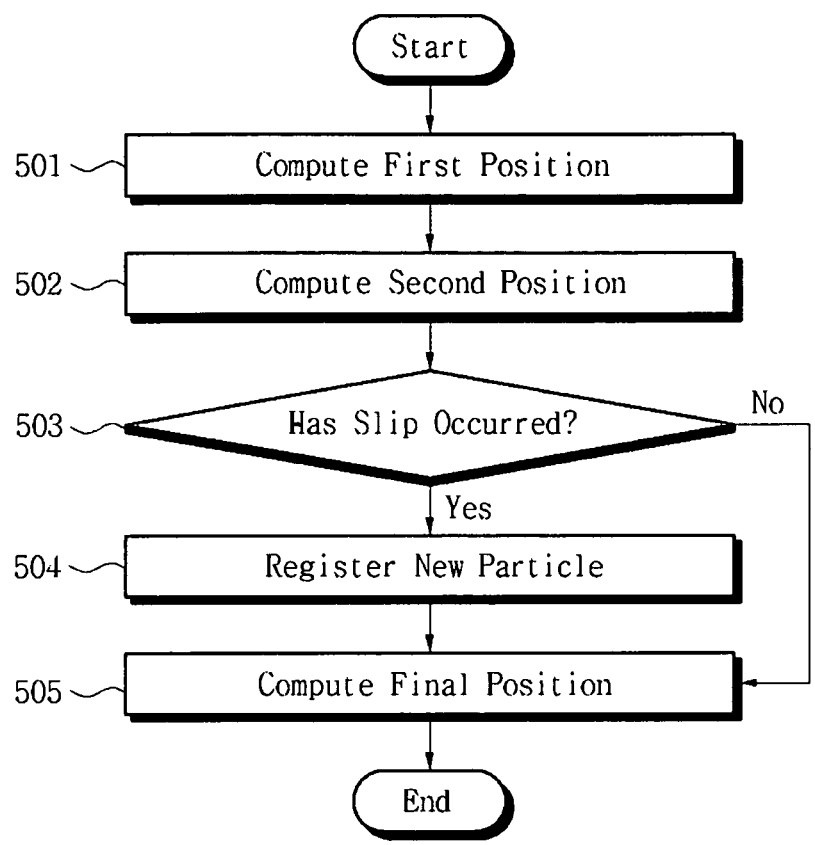

ROBOT SLIP DETECTION APPARATUS AND METHOD

CROSS-REFERENCE TO RELATED APPLICATIONS

This application claims the benefit under 35 U.S.C. §119 (a) of Korean Patent Application No. 10-2009-1307, filed on Jan. 7, 2009, the disclosure of which is incorporated herein in its entirety by reference.

BACKGROUND

1. Field

One or more embodiments relate to a technique of recognizing a position of a robot that can be applied to a robot, and movement based on the recognized position at home or indoors.

2. Description of the Related Art

The term robot has typically referred to human-shaped mechanical devices with hands, feet, and other parts that operate similarly to a human being. However, the use of this term has recently expanded to refer to automatic devices that autonomously perform tasks regardless of shape or form.

In particular, mobile robots are noted for their ability to perform tasks in extreme circumstances or risky places in place of a human being. Mobile robots for home use which autonomously move about a home to help with household affairs, such as cleaning robots, have also recently come into wide use.

In order for a mobile robot to autonomously move to perform tasks, a localization technique that enables the robot to recognize its position is typically necessary. Simultaneous localization and mapping (SLAM) is representative of such localization techniques. SLAM is a technique which enables a robot to detect ambient environment information, process the obtained information, make a map corresponding to a space in which a given task is performed, and estimate its absolute position.

In order to perform SLAM, a robot typically must acquire ambient information, but when an unexpected slip occurs while a robot is moving, acquired information has a large error, and inaccurate position recognition is performed.

SUMMARY

One or more embodiments relate to a technique in which the accuracy in the detecting of a slip of a robot and the accuracy in recognizing a position of the robot are improved by combining a position recognition technique using a particle filter and a position recognition technique using feature information matching.

According to one or more embodiments, there is provided a robot slip detection apparatus, including a first position computing unit, a second position computing unit, and a slip detecting unit. The first position computing unit computes a first position of a robot using a particle filter. The second position computing unit computes a second position of the robot using feature information of images. The slip detecting unit detects a slip of the robot based on the first position and the second position and registers the second position as a new particle for computing a new first position using a particle filter based on the new particle when the slip is detected.

According to one or more embodiments, there is provided a robot slip detection apparatus, including a first position computing unit, a second position computing unit, and a slip detecting unit. The first position computing unit computes a first position of a robot using a particle filter. The second position computing unit computes a second position of the robot using feature information of images. The slip detecting unit detects a slip of the robot based on the second position and at least one of a plurality of particles for computing the first position and registers the second position as a new particle for computing a new first position using a particle filter based on the new particle when the slip is detected.

The first position computing unit may include a particle spreading unit which spreads a plurality of particles in a predetermined area, a probability computing unit which computes probabilities that the robot will be positioned at each of the spread particles, and a particle selecting unit which selects a particle from the spread particles which has the highest probability for a current position of the robot among the spread particles as the first position.

The feature information of images may include feature information of a current ceiling image and feature information of a previous ceiling image.

The slip detecting unit may determine that the slip has occurred when a distance between the first position and the second position meets a threshold value, or determines that the slip has occurred when a distance between the second position and at least one of the plurality of particles for computing the first position meets a threshold value.

When the slip is detected, the first position computing unit may compute the new first position using the new particle registered by the slip detecting unit and determines the computed new first position as a final position of the robot.

According to another aspect, there is provided a method of detecting a slip of a robot, including computing a first position of a robot using a particle filter, computing a second position of the robot using feature information of images, and detecting a slip of the robot based on the first position and the second position and registering the second position as a new particle for computing a new first position using a particle filter based on the new particle when the slip is detected.

According to another aspect, there is provided a method of detecting a slip of a robot, including computing a first position of a robot using a particle filter, computing a second position of the robot using feature information of images, and detecting a slip of the robot based on the second position and at least one of a plurality of particles for computing the first position and registering the second position as a new particle for computing a new first position using a particle filter based on the new particle when the slip is detected.

The method may further include, when the slip is detected, computing the new first position using the new particle and determining the computed new first position as a final position of the robot.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a flowchart illustrating a method of detecting a slip of a robot according to an exemplary embodiment.

DETAILED DESCRIPTION OF EMBODIMENTS

Figure 1:
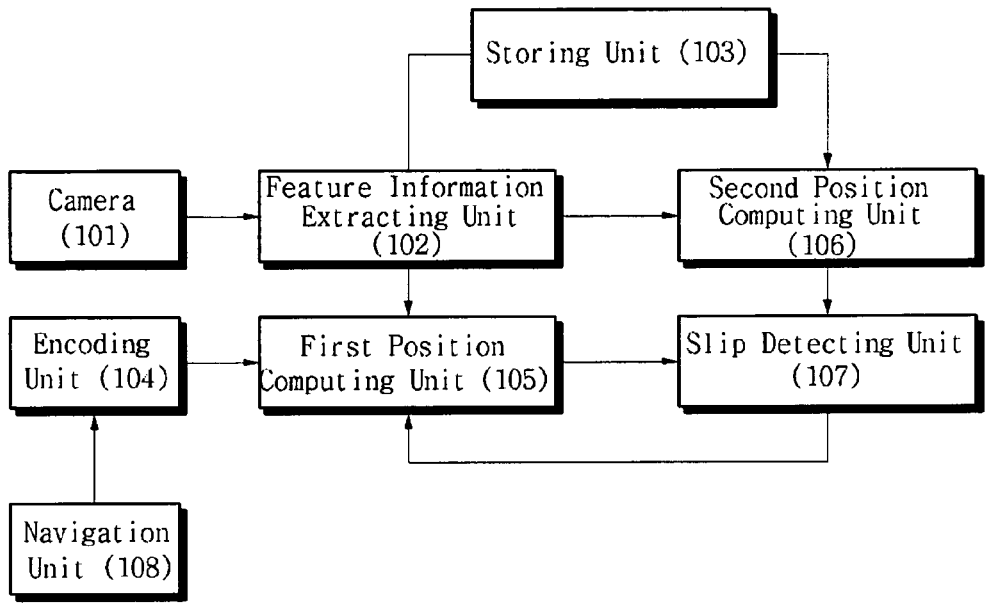
FIG. 1 is a block diagram of a robot slip detection apparatus according to an exemplary embodiment.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of a robot slip detection apparatus according to an exemplary embodiment.

Referring to FIG. 1, a robot slip detection apparatus 100 may include a camera 101, a feature information extracting unit 102, a storing unit 103, an encoding unit 104, a first position computing unit 105, a second position computing unit 106, and a slip detecting unit 107.

The camera 101 captures an image of an ambient area or environment and may include an image sensor (for example, a charged-coupled device (CCD)-type or a complimentary metal-oxide semiconductor (CMOS)-type) which converts light incident from a subject into an electrical signal and an image processing module which receives an output of the image sensor and performs image processing on it.

In the exemplary embodiment, the camera 101 may be disposed on a top portion of a robot to pick up an image of a ceiling of a working space of the robot. For example, a landmark may have been installed in the ceiling.

The feature information extracting unit 102 receives an image from the camera 101 and extracts feature information from the received image.

A feature point such as a corner or light fixture may be extracted as feature information from a ceiling image. For example, the feature information extracting unit 102 may use a Harris corner detection technique to detect a corner in an image and extract patch information in which an image around a corner is cut to a predetermined size.

The storing unit 103 stores feature information of an image which is extracted by the feature information extracting unit 102.

In an exemplary embodiment, the robot moves in a predetermined area to perform tasks, the camera 101 periodically picks up an image of the ceiling, and the feature information extracting unit 102 extracts feature information from each ceiling image, and stores extracted feature information in the storing unit 103 or provides the first and second position computing units 105 and 106 with extracted feature information.

The encoding unit 104 receives an output signal of a navigation unit 108 which provides power to the robot and measures a position change or a direction change between a previous position and a current position of the robot.

To this end, the encoding unit 104 may include an encoding unit module which detects rotation of wheels installed in the navigation unit 108 and measures a distance which the robot moves and a gyroscope sensor module which detects a direction change of the robot.

The first position computing unit 105 computes a first position, which is a candidate position of the robot, using a particle filter.

For example, the first position computing unit 105 may estimate a current position of the robot such that it spreads a plurality of particles at a position at which the robot is expected to be positioned using an output signal of the encoding unit 104, computes probabilities that the robot will be positioned at each particle and selects a particle having the highest probability as a first position. At this time, the probabilities that the robot will be positioned at each particle may be computed using feature information of a current image received from the feature information extracting unit 102. Thus, a first position can be determined.

The second position computing unit 106 compares feature information of a current image with feature information of a previous image to compute an estimated second position which is another candidate position of the robot.

For example, the second position computing unit 106 may receive current feature information of a ceiling image from the feature information extracting unit 102, receive previous feature information of a ceiling image from the feature information storing unit 103, and estimate a current position of the robot through feature point matching.

In the exemplary embodiment, the position of the robot is computed by processing a variety of collected information, but the collected information may include an error. Therefore, the first position or the second position can be understood as a candidate position or an estimation position for finally determining the position of the robot. That is, the first position and the second position may be identical to or different from each other. When the first position and the second position are identical to each other, it can be understood that a slip of the robot has not occurred, while upon the first position and the second position being determined to be different from each other and a determined difference is large or meets a threshold, it can be inferred that a slip of the robot has occurred.

The slip detecting unit 107 compares the first position with the second position to detect whether or not a slip has occurred. For example, when a difference between the first position and the second position is equal to or more than a predetermined threshold value, it can be inferred that a slip has occurred.

Alternatively, the slip detecting unit 107 may compare one of a plurality of particles for computing the first position with the second position to detect whether or not a slip has occurred. For example, when a difference between a certain particle closest to the second position and the second position is equal to or more than a predetermined threshold value, it can be inferred that a slip has occurred.

The slip detecting unit 107 registers the second position as a new particle for computing the first position when it is determined that a slip has occurred.

When a slip is determined to have occurred, as described above, the first position computing unit 105 computes a first position again using the new particle registered by the slip detecting unit 107 and determines the first position which is computed again as a final position of the robot.

Figure 2:
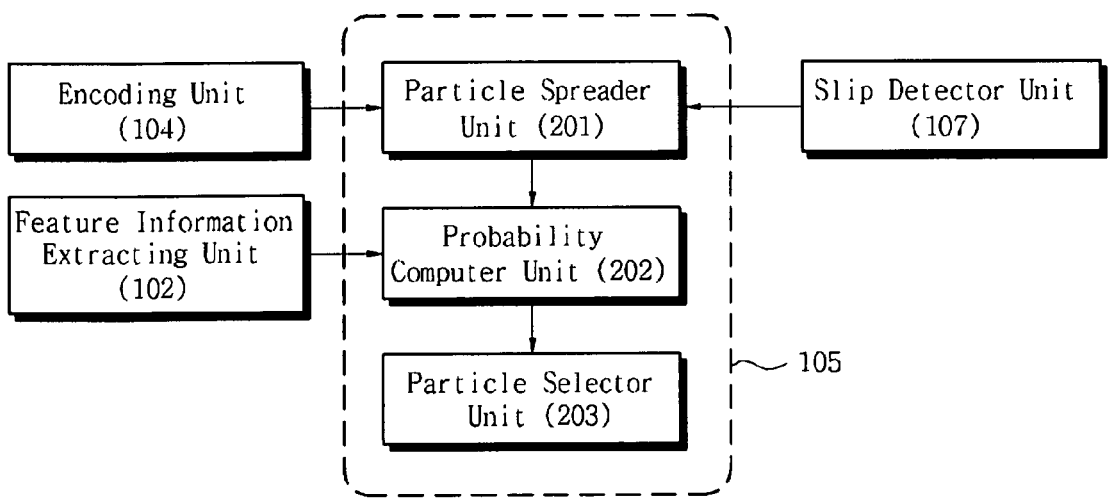
FIG. 2 is a block diagram of a first position computing unit according to an exemplary embodiment.

FIG. 2 is a block diagram of the first position computing unit 105 according to an exemplary embodiment.

Referring to FIG. 2, the first position computing unit 105 may include a particle spreading unit 201, a probability computing unit 202, and a particle selecting unit 203.

The particle spreading unit 201 spreads a plurality of particles at a predetermined spot. Each particle may be a candidate position for computing a first position. For example, the particle spreading unit 201 may designate a plurality of candidate positions (i.e., particles) around an approximate position of the robot based on information received from the encoding unit 104.

The probability computing unit 202 computes a robot position probability value for each particle. The robot position probability value represents a probability that the robot will be positioned at any particle. The robot position probability value may be computed by comparing feature information estimated at each particle and feature information of a current image received in the feature information extracting unit 102.

The particle selecting unit 203 selects a particle which has the highest robot position probability value among computed robot position probability values as the first position.

The particle spreading unit 201 may receive an output of the slip detecting unit 107. For example, when it is determined by the slip detecting unit 107 that a slip has occurred, the second position is selected as a new particle, and the particle spreading unit 102 may add the second position as a particle and spread particles including the particle representing the second position according to an instruction of the slip detecting unit 107.

Figure 3:
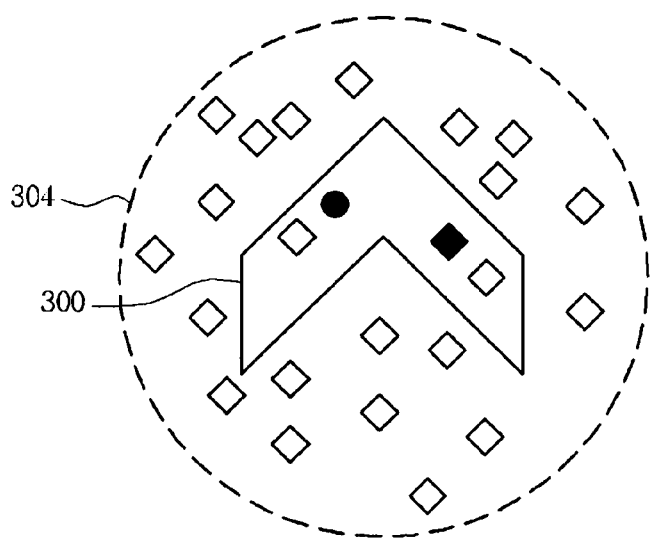
FIG. 3 illustrates an operation principle of a robot slip detection apparatus when a slip does not occur according to an exemplary embodiment.

FIG. 3 illustrates an operation principle of the robot slip detection apparatus when a slip does not occur according to an exemplary embodiment.

In FIG. 3, reference numeral 300 denotes a robot, reference numeral 303 denotes a plurality of particles, reference numeral 301 denotes a first position, and reference numeral 302 denotes a second position.

First, a particle (i.e., particle 301) which has the highest position probability value is selected among the plurality of particles 303 spread in an area 304 around an approximate position in which the robot 300 is present to compute the first position 301.

Current feature information and previous feature information for a ceiling which are obtained by the robot 300 are compared to compute the second position 302.

Subsequently, the first position 301 and the second position 302 are compared. It can be seen from FIG. 3 that the first position 301 and the second position 302 are at a relatively short distance from each other, and it can be determined that the robot 300 has not slipped.

Therefore, either the first position 301 or the second position can be determined as a final position of the robot 300.

Figure 4:
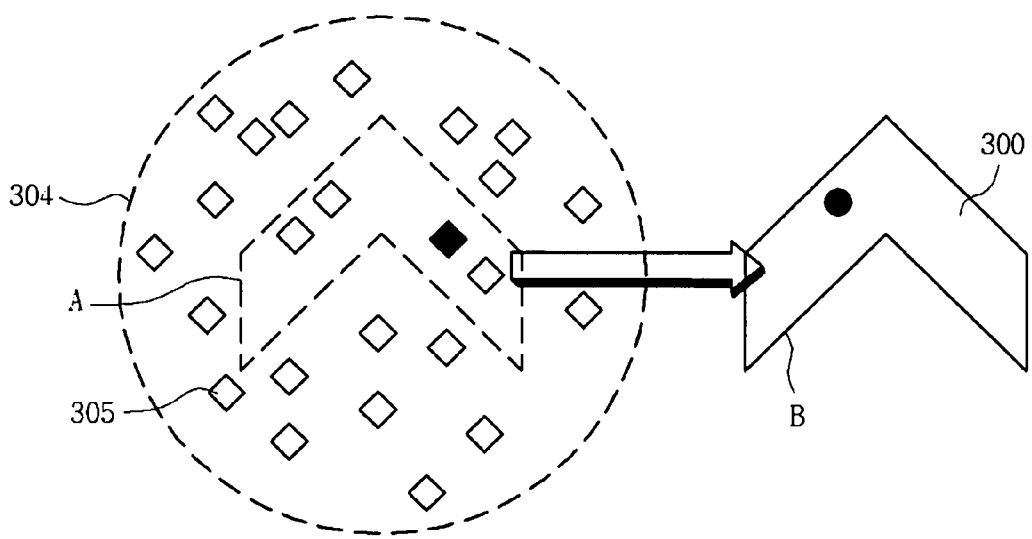
FIG. 4 illustrates an operation principle of a robot slip detection apparatus when a slip occurs according to an exemplary embodiment.

FIG. 4 illustrates an operation principle of the robot slip detection apparatus when a slip is determined to have occurred according to an exemplary embodiment.

In FIG. 4, reference numeral 300 denotes a robot, reference numeral 303 denotes a plurality of particles, reference numeral 301 denotes a first position, and reference numeral 302 denotes a second position. Unlike FIG. 3, it can be seen from FIG. 4 that the robot 300 has slipped and thus moved from a position A to a position B in a moment.

An approximate position area 304 in which the plurality of particles 303 are spread is determined based on information of the encoding unit 104. When the robot 300 slips, the encoding unit 104 cannot detect a slip of the robot 300, and thus the plurality of particles 303 are spread around the position A even though the robot 300 is positioned at the position B.

Therefore, it can be understood that a distance between the first position 301 and the second position 302 is longer than that of FIG. 3 by comparing the first position 301 and the second position 302.

In this case, it is regarded that a slip has occurred, and the second position 302 may be added as a new particle to perform position correction.

For example, particles may be spread around the second position 302. Alternatively, a radius of an area (e.g., area 304) in which particles are spread may be extended to include the second position 302.

Also, in order to determine whether or not a slip has occurred, the first position 301 and the second position 302 may be compared with each other, or the second position 302 may be compared with a particle (e.g., particle 305) which is closest to the second position 301 among the plurality of particles 303.

FIG. 5 is a flowchart illustrating a method of detecting a slip of a robot according to an exemplary embodiment.

First, a first position of a robot is computed (operation 501).

The first position may be estimated using a particle filter. For example, an approximate position of the robot is computed using encoding unit information, a plurality of particles are spread around the approximate position, a robot position probability value of the robot is computed for each particle, and a particle having the highest position probability value is selected as the first position.

Then, a second position of the robot is computed (operation 502).

The second position of the robot may be estimated by comparing feature information of a current image with feature information of a previous image. For example, the second position may be computed by picking up a ceiling image through a camera and matching feature information of a current image and feature information of a previous image.

Next, it is determined whether or not a slip has occurred (operation 503).

The first position may be compared with the second position to determine whether a slip has occurred. For example, it may be regarded that a slip has occurred when a distance between the first position and the second position is equal to or more than a predetermined threshold value.

Alternatively, the second position may be compared with any one of the plurality of particles for computing the first position to determine whether or not a slip has occurred. For example, it may be regarded that a slip has occurred when a distance between the second position and a particle which is closest to the second position is equal to or more than a predetermined threshold value.

When it is determined that a slip has occurred, the second position is registered as a new particle (operation 504).

Here, the new particle may be a particle necessary for computing the first position.

Subsequently, a final position of the robot is computed (operation 505).

For example, when a slip occurs, the final position may be computed through a particle filter using the particle newly registered in operation 504. For example, the first position may be computed again using the newly registered particle, and the first position which is computed again may be determined as the final position. At this time, the registered particle may be used such that a radius of an area in which particles are spread is extended to include the second position or new particles are spread centering on the second position.

However, when it is determined that a slip has not occurred, the first position computed in operation 501 or the second position computed in operation 502 may be determined as the final position.

As apparent from the above description, according to exemplary embodiments, since a slip of a robot is detected by combining a position recognition technique using a particle filter and a position recognition technique using feature information matching, a position of the robot can be more accurately detected, and when a slip occurs, relocation can be rapidly performed. Herein, the position recognition technique using a particle filter and the position recognition technique using feature information matching refers are defined as two different types of position recognition techniques, compared to two similar recognition techniques that would, respectively, be represented by two distinguishable position recognition techniques using a particle filter or two distinguishable position recognition techniques using feature information matching.

In addition to the above described embodiments, embodiments can also be implemented through computer readable code/instructions in/on a medium, e.g., a computer readable medium, to control at least one processing device to implement any above described embodiment. The medium can correspond to any defined, measurable, and tangible structure permitting the storing and/or transmission of the computer readable code.

The computer readable media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A robot slip detection apparatus, comprising:
a first position computing unit which computes a first position of a robot using a particle filter;
a second position computing unit which computes a second position of the robot by comparing feature information of a current image with feature information of a previous image; and
a slip detecting unit which detects a slip of the robot based on the first position and the second position and registers the second position as a new particle for computing a new first position using a particle filter based on the new particle when the slip is detected.

2. The robot slip detection apparatus of claim 1, wherein the first position computing unit comprises:
a particle spreading unit which spreads a plurality of particles in a predetermined area;
a probability computing unit which computes probabilities that the robot will be positioned at each of the spread particles; and
a particle selecting unit which selects a particle from the spread particles which has the highest probability for a current position of the robot among the spread particles as the first position.

3. The robot slip detection apparatus of claim 1, wherein the feature information of images comprises feature information of a current ceiling image and feature information of a previous ceiling image.

4. The robot slip detection apparatus of claim 1, wherein the slip detecting unit determines that the slip has occurred when a distance between the first position and the second position meets a threshold value.

5. The robot slip detection apparatus of claim 1, wherein when the slip occurs, the first position computing unit computes the new first position using the new particle registered by the slip detecting unit and determines the computed new first position as a final position of the robot.

6. A robot slip detection apparatus, comprising:
a first position computing unit which computes a first position of a robot using a particle filter;
a second position computing unit which computes a second position of the robot by comparing feature information of a current image with feature information of a previous image; and
a slip detecting unit which detects a slip of the robot based on the second position and at least one of a plurality of particles for computing the first position and registers the second position as a new particle for computing a new first position using a particle filter based on the new particle when the slip is detected.

7. The robot slip detection apparatus of claim 6, wherein the first position computing unit comprises:
a particle spreading unit which spreads a plurality of particles in a predetermined area;
a probability computing unit which computes probabilities that the robot will be positioned at each of the spread particles; and
a particle selecting unit which selects a particle from the spread particles which has the highest probability for a current position of the robot among the spread particles as the first position.

8. The robot slip detection apparatus of claim 6, wherein the feature information of images comprises feature information of a current ceiling image and feature information of a previous ceiling image.

9. The robot slip detection apparatus of claim 6,
wherein the slip detecting unit determines that the slip has occurred when a distance between the second position and at least one of the plurality of particles for computing the first position meets a threshold value.

10. The robot slip detection apparatus of claim 6, wherein when the slip is detected, the first position computing unit computes the new first position using the new particle registered by the slip detecting unit and determines the computed new first position a final position of the robot.

11. A method of detecting a slip of a robot, comprising:
computing a first position of a robot using a particle filter;
computing a second position of the robot by comparing feature information of a current image with feature information of a previous image; and
detecting a slip of the robot based on the first position and the second position and registering the second position as a new particle for computing a new first position using a particle filter based on the new particle when the slip is detected.

12. The method of claim 11, wherein the computing of the first position comprises:
   spreading a plurality of particles in a predetermined area;
   computing probabilities that the robot will be positioned at each of the spread particles; and
   selecting a particle from the spread particles which has the highest probability for a current position of the robot among the spread particles as the first position.

13. The method of claim 11, wherein the feature information of images comprises feature information of a current ceiling image and feature information of a previous ceiling image.

14. The method of claim 11, determining that the slip has occurred when a distance between the first position and the second position meets a threshold value.

15. The method of claim 11, further comprising, when the slip is detected, computing the new first position using the new particle and determining the computed new first position as a final position of the robot.

16. A method of detecting a slip of a robot, comprising:
   computing a first position of a robot using a particle filter;
   computing a second position of the robot by comparing feature information of a current image with feature information of a previous image; and
   detecting a slip of the robot based on the second position and at least one of a plurality of particles for computing the first position and registering the second position as a new particle for computing a new first position using a particle filter based on the new particle when the slip is detected.

17. The method of claim 16, wherein the computing of the first position comprises:
   spreading a plurality of particles in a predetermined area;
   computing probabilities that the robot will be positioned at each of the spread particles; and
   selecting a particle from the spread particles which has the highest probability for a current position of the robot among the spread particles as the first position.

18. The method of claim 16, wherein the feature information of images comprises feature information of a current ceiling image and feature information of a previous ceiling image.

19. The method of claim 16, wherein it is determined that the slip has occurred when a distance between the second position and at least one of the plurality of particles for computing the first position meets a threshold value.

20. The method of claim 16, further comprising, when the slip is detected, computing the new first position using the new particle and determining the computed new first position as a final position of the robot.

* * * * *

UNITED STATES PATENT AND TRADEMARK OFFICE
CERTIFICATE OF CORRECTION

PATENT NO. : 8,938,319 B2  
APPLICATION NO. : 12/588957  
DATED : January 20, 2015  
INVENTOR(S) : Jun-ho Park et al.

Page 1 of 1

It is certified that error appears in the above-identified patent and that said Letters Patent is hereby corrected as shown below:

Title Page, item (56), Other Publications,

Column 2, line 1, delete "defintion" and insert -- definition --.

Column 2, line 1, delete "Webser" and insert -- Webster --, therefor.

Signed and Sealed this
Seventh Day of July, 2015

Michelle K. Lee
*Director of the United States Patent and Trademark Office*